(12) United States Patent
Yamashita

(10) Patent No.: US 11,438,749 B2
(45) Date of Patent: Sep. 6, 2022

(54) ACOUSTIC APPARATUS AND VOLUME CONTROL METHOD FOR ACOUSTIC APPARATUS

(71) Applicants: Kabushiki Kaisha Toshiba, Tokyo (JP); Toshiba Electronic Devices & Storage Corporation, Tokyo (JP)

(72) Inventor: Makoto Yamashita, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/405,635

(22) Filed: Aug. 18, 2021

(65) Prior Publication Data
US 2022/0078594 A1    Mar. 10, 2022

(30) Foreign Application Priority Data

Sep. 9, 2020    (JP) .............................. JP2020-151547

(51) Int. Cl.
*H04W 4/80*    (2018.01)
*H04W 84/18*    (2009.01)

(52) U.S. Cl.
CPC ............. *H04W 4/80* (2018.02); *H04W 84/18* (2013.01)

(58) Field of Classification Search
CPC ............................... H04W 4/80; H04W 84/18
See application file for complete search history.

(56) References Cited

U.S. PATENT DOCUMENTS

| | | | |
|---|---|---|---|
| 2012/0051561 A1* | 3/2012 | Cohen ..................... | G10L 21/00 381/122 |
| 2014/0180684 A1* | 6/2014 | Strub .................... | G10L 19/008 704/211 |
| 2018/0249274 A1* | 8/2018 | Lyren ...................... | H04S 7/303 |
| 2019/0053001 A1* | 2/2019 | Tanabe .................. | H04W 4/021 |
| 2019/0394209 A1* | 12/2019 | Urabe ...................... | G01S 5/12 |
| 2020/0128346 A1* | 4/2020 | Noh ........................ | H04S 3/008 |
| 2020/0322868 A1* | 10/2020 | Claffey .................... | H04L 12/44 |
| 2021/0174792 A1* | 6/2021 | Zheng ................... | G01S 3/8006 |

FOREIGN PATENT DOCUMENTS

| | | |
|---|---|---|
| JP | 2006-067468 A | 3/2006 |
| JP | 2007-013407 A | 1/2007 |
| JP | 2020-005024 A | 1/2020 |

\* cited by examiner

*Primary Examiner* — David Bilodeau
(74) *Attorney, Agent, or Firm* — Allen & Overy LLP

(57) ABSTRACT

An acoustic apparatus according to each of the embodiments includes a reception unit, an operation unit, and a control unit. The reception unit is configured to receive a packet to which voice data and a signal for azimuth estimate are added. The operation unit is configured to operate a signal angle of the packet by using the signal for azimuth estimate. The control unit is configured to control information related to a sound image of the voice data according to the signal angle.

14 Claims, 10 Drawing Sheets

| TRANSMISSION ANGLE | VOLUME VALUE OF LEFT-SIDE SPEAKER | VOLUME VALUE OF RIGHT-SIDE SPEAKER |
|---|---|---|
| AT LEAST 0 DEGREES AND SMALLER THAN 60 DEGREES | 100% | 50% |
| AT LEAST 60 DEGREES AND SMALLER THAN 120 DEGREES | 100% | 100% |
| AT LEAST 120 DEGREES AND SMALLER THAN 180 DEGREES | 50% | 100% |

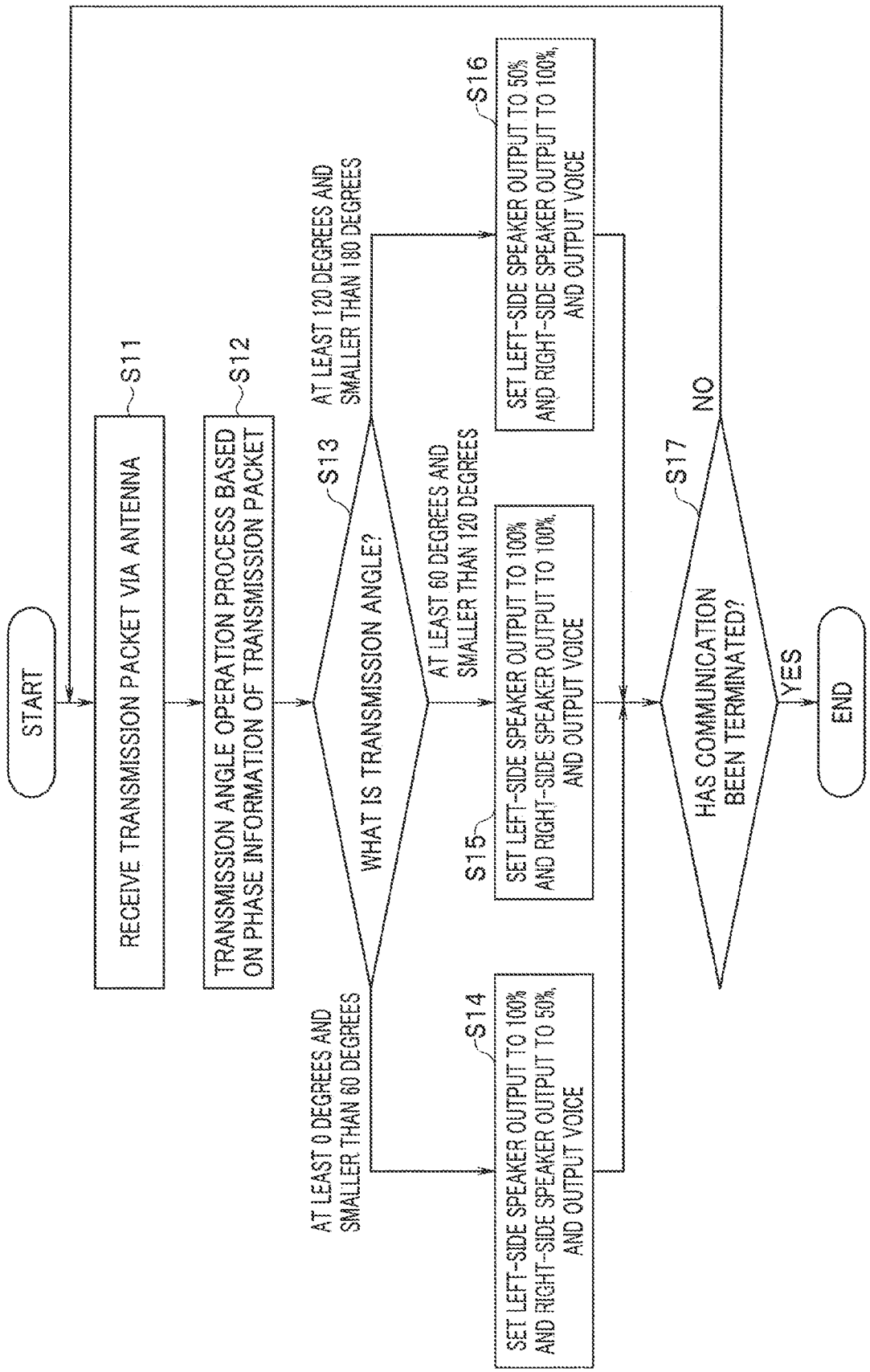

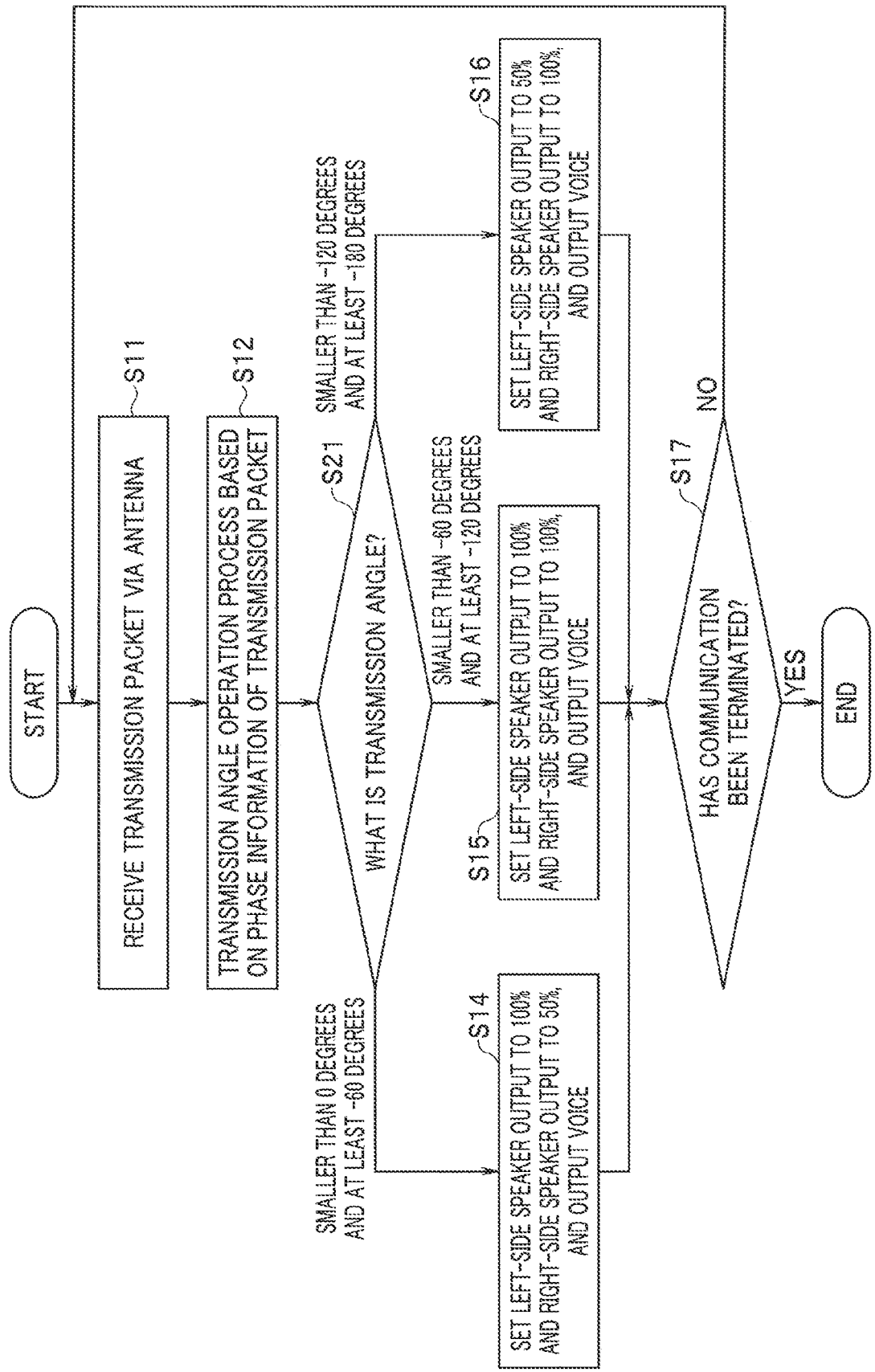

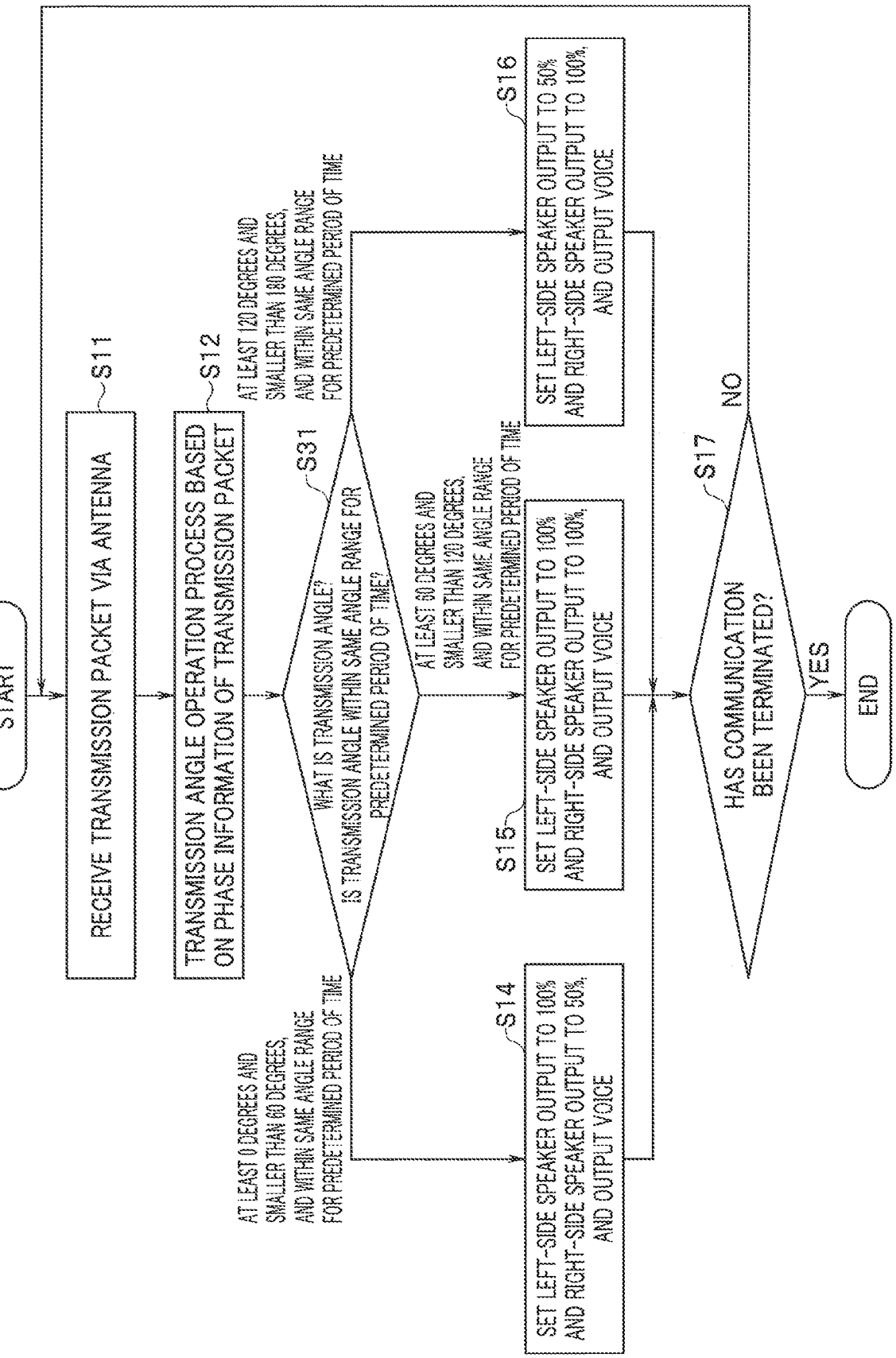

FIG. 12

| TRANSMISSION ANGLE | VOLUME VALUE OF LEFT-SIDE SPEAKER | VOLUME VALUE OF RIGHT-SIDE SPEAKER |
|---|---|---|
| AT LEAST 0 DEGREES AND SMALLER THAN 20 DEGREES | 100% | 60% |
| AT LEAST 20 DEGREES AND SMALLER THAN 40 DEGREES | 100% | 70% |
| AT LEAST 40 DEGREES AND SMALLER THAN 60 DEGREES | 100% | 80% |
| AT LEAST 60 DEGREES AND SMALLER THAN 80 DEGREES | 100% | 90% |
| AT LEAST 80 DEGREES AND SMALLER THAN 100 DEGREES | 100% | 100% |
| AT LEAST 100 DEGREES AND SMALLER THAN 120 DEGREES | 90% | 100% |
| AT LEAST 120 DEGREES AND SMALLER THAN 140 DEGREES | 80% | 100% |
| AT LEAST 140 DEGREES AND SMALLER THAN 160 DEGREES | 70% | 100% |
| AT LEAST 160 DEGREES AND SMALLER THAN 180 DEGREES | 60% | 100% |

FIG. 13

| TRANSMISSION ANGLE | VOLUME VALUE OF LEFT-SIDE SPEAKER | VOLUME VALUE OF RIGHT-SIDE SPEAKER |
|---|---|---|
| AT LEAST 0 DEGREES AND SMALLER THAN 60 DEGREES | 50% | 25% |
| AT LEAST 60 DEGREES AND SMALLER THAN 120 DEGREES | 50% | 50% |
| AT LEAST 120 DEGREES AND SMALLER THAN 180 DEGREES | 25% | 50% |

ACOUSTIC APPARATUS AND VOLUME CONTROL METHOD FOR ACOUSTIC APPARATUS

CROSS-REFERENCE TO RELATED APPLICATIONS

This application is based upon and claims the benefit of priority from the prior Japanese Patent Application No. 2020-151547 filed on Sep. 9, 2020; the entire contents of which are incorporated herein by reference.

FIELD

Embodiments described herein relate generally to an acoustic apparatus and a volume control method for an acoustic apparatus.

BACKGROUND

Conventionally, playing back music on speakers or headphones by audio streaming from a music playback app on a smartphone and the like in a wireless manner through Bluetooth (registered trademark) has been realized.

In recent years, the Bluetooth Low Energy (hereinafter referred to as "BLE" for short) standard enabling further reduction of electric power consumption than the conventional Bluetooth (registered trademark) has been developed. Furthermore, a standard (Bluetooth LE Audio) is being developed for realizing, by BLE, the function of streaming audio playback of the conventional Bluetooth. The standard has a broadcast audio function with which voice is transmitted from one transmission device to a plurality of reception devices.

BRIEF DESCRIPTION OF THE DRAWINGS

FIG. 9 is a flow chart showing an example of volume control processing in the audio reception device;

FIG. 10 is a flow chart showing another example of the volume control processing in the audio reception device;

FIG. 11 is a flow chart showing yet another example of the volume control processing in the audio reception device;

FIG. 12 is a diagram showing a relationship between a transmission angle of finer granularity and respective volume values of the left-side and right-side speakers;

FIG. 13 is a diagram showing a relationship between a transmission angle and respective volume values of left-side and right-side speakers when loudness of a lecturer's voice is greater than or equal to a first threshold.

DETAILED DESCRIPTION

An acoustic apparatus according to each of the embodiments includes a reception unit, an operation unit, and a control unit. The reception unit is configured to receive a packet to which voice data and a signal for azimuth estimate are added. The operation unit is configured to operate a signal angle of the packet by using the signal for azimuth estimate. The control unit is configured to control information related to a sound image of the voice data according to the signal angle.

Hereinafter, the embodiments are described in detail with reference to the drawings.

First Embodiment

Figure 1:
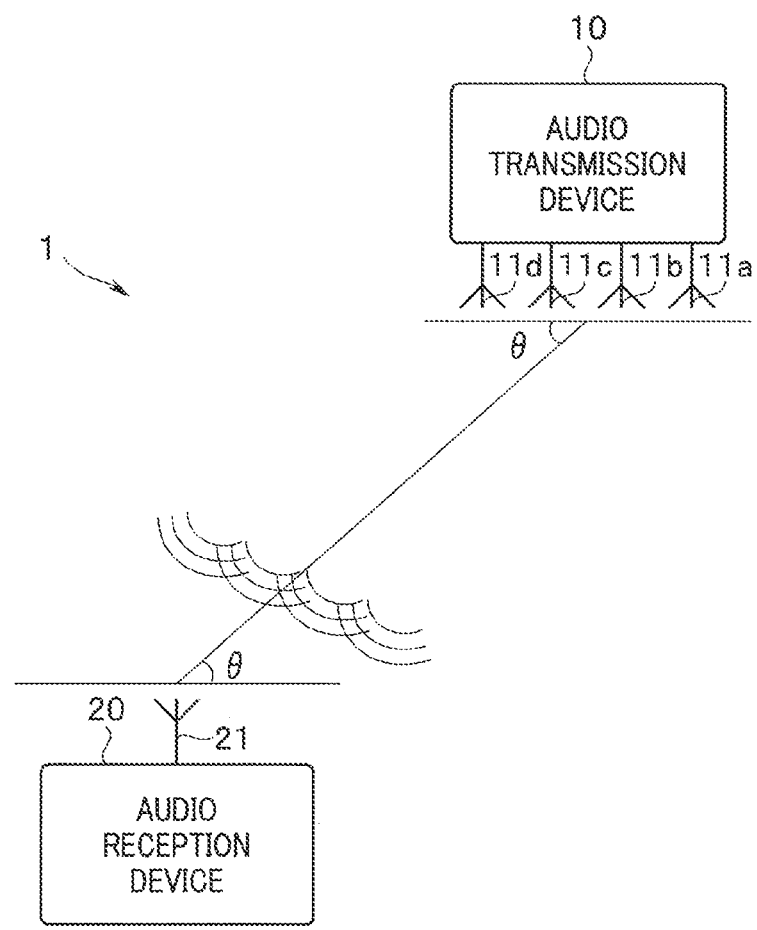
FIG. 1 is a diagram showing a configuration of a communication system of a first embodiment.

FIG. 1 is a diagram showing a configuration of a communication system of a first embodiment.

As shown in FIG. 1, a communication system 1 is configured to include an audio transmission device 10 and an audio reception device 20, and carries out wireless communication between the audio transmission device 10 and the audio reception device 20. Note that the standard later than Bluetooth 5.1 is used as the wireless communication method in the present embodiment.

The audio transmission device 10 is provided with a plurality of antennas 11a, 11b, 11c, and 11d. The audio reception device 20 is provided with one antenna 21. Note that although the audio transmission device 10 is provided with the four antennas 11a to 11d linearly arranged at regular intervals in the example shown in FIG. 1, the present embodiment is not limited to such a configuration and only required to be provided with at least two antennas.

The audio transmission device 10 transmits a transmission packet P, which contains audio streaming data (voice data) and a CTE (constant tone extension) to which a signal for azimuth estimate is added, to the audio reception device 20 while switching among the plurality of antennas 11a to 11d.

The audio reception device 20 as the acoustic apparatus receives the transmission packet P containing the CTE transmitted from the audio transmission device 10, and plays back voice based on the audio streaming data. The audio reception device 20 calculates a signal angle of the transmission packet P transmitted from the audio transmission device 10 on the basis of the signal for azimuth estimate added to the CTE, and controls information related to a sound image according to the signal angle. The signal angle means: a transmission angle θ being a direction in which the audio reception device 20 is positioned with respect to the audio transmission device 10; and a reception angle being a direction in which the audio transmission device 10 is positioned with respect to the audio reception device 20. In the first embodiment, the transmission angle is used as the signal angle.

The audio reception device 20 of the first embodiment calculates the transmission angle θ by the AoD (angle of departure) method, which allows azimuth estimate by receiving with the one antenna 21 the transmission packet P transmitted while switching among the plurality of antennas 11a to 11d of the audio transmission device 10. As described later in detail, the audio reception device 20 is embedded in, for example, headphones, and controls respective volume values of left-side and right-side speakers (first and second speakers) according to the transmission angle θ.

Figure 2:
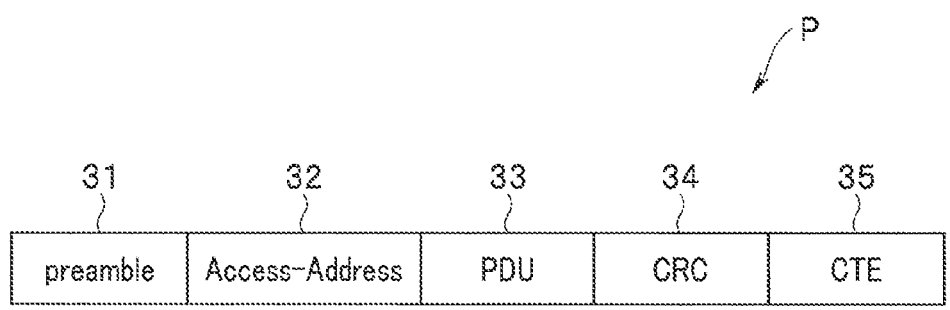
FIG. 2 is a diagram showing an example of a configuration of a transmission packet.

FIG. 2 is a diagram showing an example of a configuration of the transmission packet.

The transmission packet P includes: a preamble 31, an access-address 32, a PDU (protocol data unit) 33, a CRC (cyclic redundancy code) 34, and a CTE (constant tone extension) 35.

The preamble 31 is a field in which data for determining the head of the packet is stored. The access-address 32 is a field in which data allowing a reception device to determine whether the packet is addressed to the reception device is stored. The PDU 33 is a field in which transmission data such as audio streaming data is stored. The CRC 34 is a field in which an error correction code is stored. The CTE 35 is a field in which a signal for azimuth estimate is stored.

The audio transmission device 10 adds audio streaming data to the PCU 33 and the signal for azimuth estimate to the CTE 35, and transmits the packet to the audio reception device 20. More specifically, the audio transmission device 10 measures a phase of radio wave upon transmission with switching among the respective antennas 11a to 11d using the IQ (in-phase and quadrature) sampling, adds a value thus measured to the CTE 35, and transmits the packet to the audio reception device 20.

Figure 3:
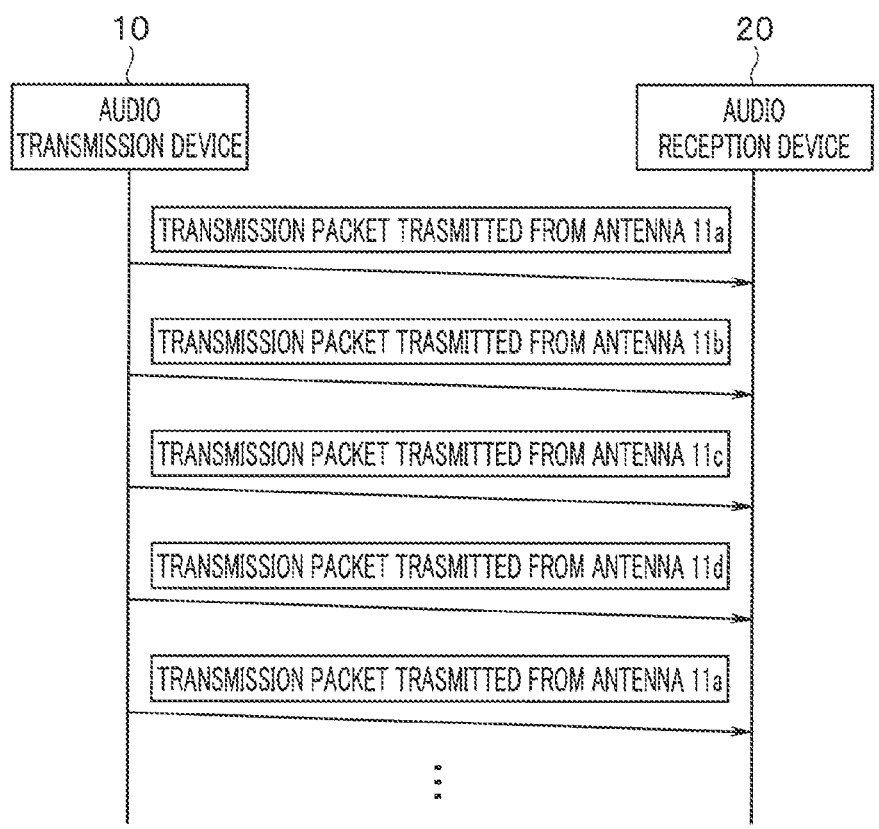
FIG. 3 is a diagram showing an example of a flow of transmission of a transmission packet from an audio transmission device to an audio reception device.

FIG. 3 is a diagram showing an example of a flow of transmission of the transmission packet from the audio transmission device to the audio reception device.

The audio transmission device 10 transmits the transmission packet P to the audio reception device 20 with sequentially switching among the plurality of antennas 11a to 11d. More specifically, as shown in FIG. 3, the transmission packet P is transmitted to the audio reception device 20, with the antennas 11a to 11d being switched in an order of: the antenna 11a; the antenna 11b; the antenna 11c; the antenna 11d; the antenna 11a; and so on.

The audio reception device 20 receives via the antenna 21 the transmission packet P sequentially transmitted from the antennas 11a to 11d of the audio transmission device 10. Note that although the transmission packet P is transmitted in the order of: the antenna 11a; the antenna 11b; the antenna 11c; the antenna 11d; the antenna 11a; and so on in the example shown in FIG. 3, the order of transmission of the transmission packet P is not limited to the order of: the antenna 11a; the antenna 11b; the antenna 11c; the antenna 11d; the antenna 11a; and so on, and may be in a different order.

Figure 4:
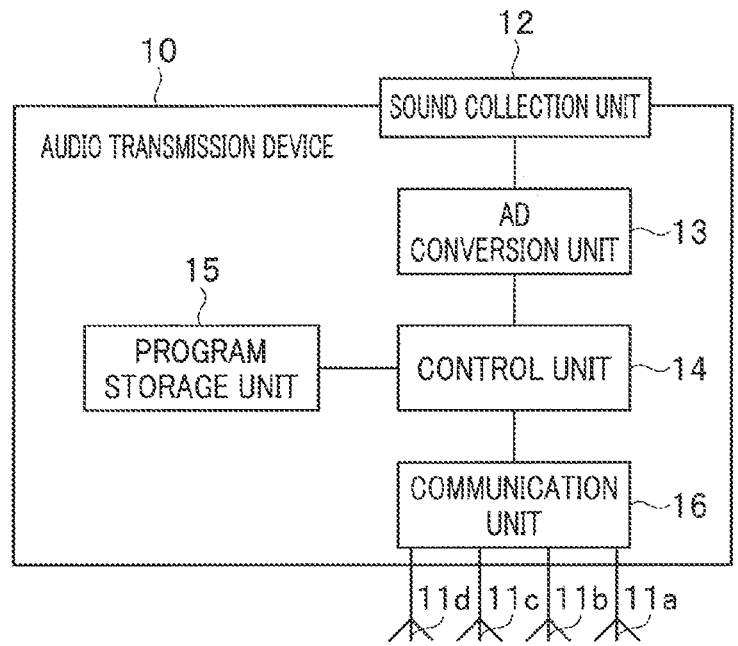
FIG. 4 is a block diagram showing a configuration of the audio transmission device.

FIG. 4 is a block diagram showing a configuration of the audio transmission device.

As shown in FIG. 4, the audio transmission device 10 is configured to include, in addition to the aforementioned plurality of antennas 11a to 11d, a sound collection unit 12, an AD conversion unit 13, a control unit 14, a program storage unit 15, and a communication unit 16.

The control unit 14 is a micro control unit (hereinafter referred to as "MCU") configured to control the AD conversion unit 13, the program storage unit 15, and the communication unit 16. The control unit 14 executes a program stored in the program storage unit 15 to communicate with the audio reception device 20, which is a communication counterpart, via the communication unit 16, and controls the audio transmission device 10 as a whole.

The sound collection unit 12 collects sound around the audio transmission device 10, for example a lecturer's voice. The voice data collected by the sound collection unit 12 is inputted to the AD conversion unit 13. The AD conversion unit 13 converts the voice data inputted, from an analog signal to a digital signal, and outputs the digital signal to the control unit 14.

The control unit 14 generates audio streaming data from the voice data of the digital signal inputted from the AD conversion unit 13. The control unit 14 also measures the phase of radio wave upon transmission with switching among the respective antennas 11a to 11d. The control unit 14: adds the audio streaming data to the PDU 33; generates the transmission packet P in which the value thus measured, which is a signal for azimuth estimate, is added to the CTE 35; and outputs the transmission packet P to the communication unit 16.

The communication unit 16 transmits the transmission packet P while switching among the antennas 11a to 11d, on the basis of the control by the control unit 14.

Figure 5:
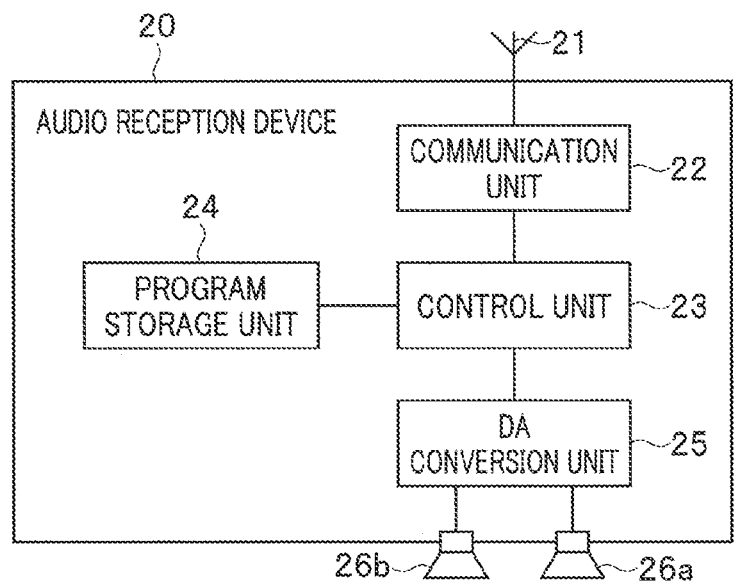
FIG. 5 is a block diagram showing a configuration of the audio reception device.

FIG. 5 is a block diagram showing a configuration of the audio reception device.

As shown in FIG. 5, the audio reception device 20 is configured to include, in addition to the aforementioned antenna 21, a communication unit 22, a control unit 23, a program storage unit 24, a DA conversion unit 25, a left-side speaker 26a, and a right-side speaker 26b.

The control unit 23 is an MCU configured to control the communication unit 22, the program storage unit 24, and the DA conversion unit 25. The control unit 23 executes a program stored in the program storage unit 24 to communicate with the audio transmission device 10, which is a communication counterpart, via the communication unit 22, and controls the audio reception device 20 as a whole.

The communication unit 22 configuring the reception unit receives via the antenna 21 the transmission packet P transmitted from the audio transmission device 10, and outputs the transmission packet P to the control unit 23.

The control unit 23 outputs the audio streaming data in the PDU 33 of the transmission packet P to the DA conversion unit 25. The control unit 23 configuring the operation unit operates the transmission angle θ at which the transmission packet P was transmitted, on the basis of the signal for azimuth estimate in the CTE 35 of the transmission packet P. The control unit 23 controls the respective volume values of the left-side speaker 26a and the right-side speaker 26b according to the transmission angle θ thus operated.

The DA conversion unit 25 converts the audio streaming data from a digital signal to an analog signal, and outputs the analog signal to the left-side speaker 26a and the right-side speaker 26b. The DA conversion unit 25 is capable of changing the volume value individually for the left-side speaker 26a and the right-side speaker 26b, through control from the control unit 23.

Figures 6, 7:
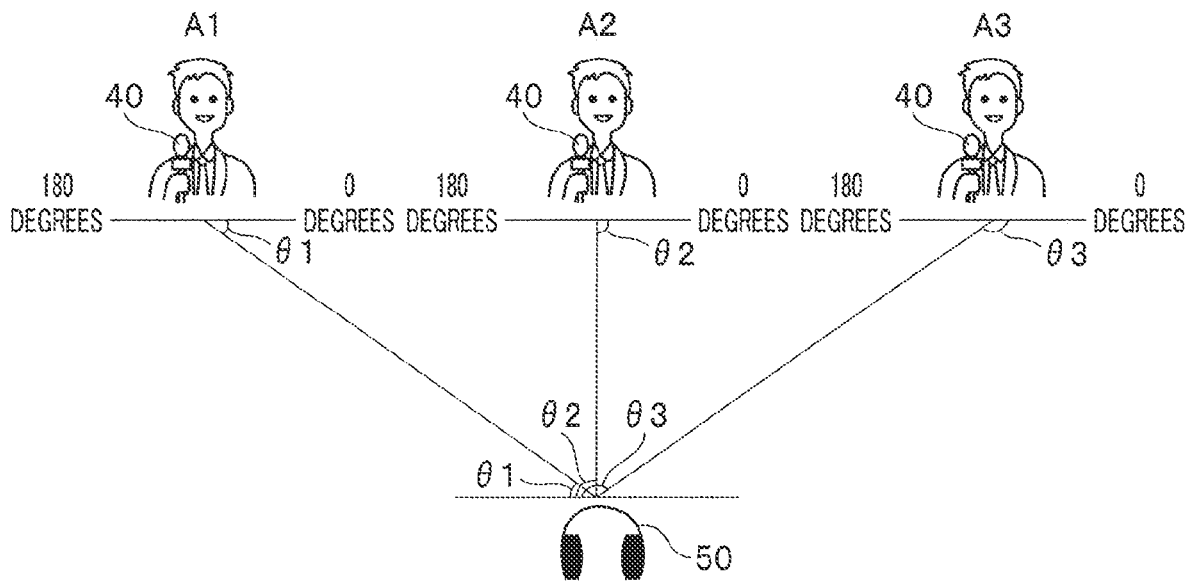
FIG. 6 is a diagram showing a positional relationship between the audio transmission device and the audio reception device.
FIG. 7 is a diagram showing a relationship between a transmission angle and respective volume values of left-side and right-side speakers.

FIG. 6 is a diagram showing a positional relationship between the audio transmission device and the audio reception device. FIG. 7 is a diagram showing a relationship between a transmission angle and respective volume values of left-side and right-side speakers; In the diagram shown in FIG. 6, for example voice of a lecturer on a stage is captured via a microphone 40 and outputted from headphones worn by a listener. The lecturer can speak while looking in a vertically downward direction in FIG. 6, and move in a horizontal direction in FIG. 6 between a position A1 and a position A3 on the stage. The listener looks in a vertically upward direction in FIG. 6, and faces the lecturer when the lecturer is in a position A2 at the center of the stage.

As shown in FIG. 6, the audio transmission device 10 is embedded in, for example, the microphone 40 used by the lecturer, and transmits the transmission packet P containing the audio streaming data, the signal for azimuth estimate, and the like.

The audio reception device 20 is embedded in, for example, headphones 50 used by a user such as the listener, determines the transmission angle θ of the transmission packet P on the basis of the signal for azimuth estimate, and plays back the audio streaming data through control of the respective volume values of the left-side speaker 26a and the right-side speaker 26b according to the transmission angle θ thus determined.

When the lecturer with the microphone 40 is in the position A1, the transmission angle θ between the microphone 40 and the headphones 50 is represented by θ1. When the lecturer with the microphone 40 is in the position A2, the transmission angle θ between the microphone 40 and the headphones 50 is represented by θ2. When the lecturer with the microphone 40 is in the position A3, the transmission angle θ between the microphone 40 and the headphones 50 is represented by θ3. Note that for the transmission angle θ of the transmission packet P, the horizontally rightward direction in FIG. 6 is a reference of 0 degrees, and the clockwise direction is the positive direction of the angle.

When the transmission angle θ1 is 30 degrees, the transmission angle θ1 falls within a range of at least 0 degrees and smaller than 60 degrees. The control unit 23 sets the volume value for the left-side speaker 26a to 100%, and the volume value for the right-side speaker 26b to 50% on the basis of the relationship shown in FIG. 7. Due to the volume value for the left-side speaker 26a being set greater than the volume value for the right-side speaker 26b, the headphones 50 of the user sound as if the lecturer is speaking from the left side.

When the transmission angle θ2 is 90 degrees, the transmission angle θ2 falls within a range of at least 60 degrees and smaller than 120 degrees. The control unit 23 sets the volume value for the left-side speaker 26a and the volume value for the right-side speaker 26b to 100% on the basis of the relationship shown in FIG. 7. Due to the same volume value being set for the left-side speaker 26a and the right-side speaker 26b, the headphones 50 of the user sound as if the lecturer is speaking from the center.

When the transmission angle θ3 is 150 degrees, the transmission angle θ3 falls within a range of at least 120 degrees and not more than 180 degrees. The control unit 23 sets the volume value for the left-side speaker 26a to 50%, and the volume value for the right-side speaker 26b to 100% on the basis of the relationship shown in FIG. 7. Due to the volume value for the right-side speaker 26b being set greater than the volume value for the left-side speaker 26a, the headphones 50 of the user sound as if the lecturer is speaking from the right side.

Figure 8:
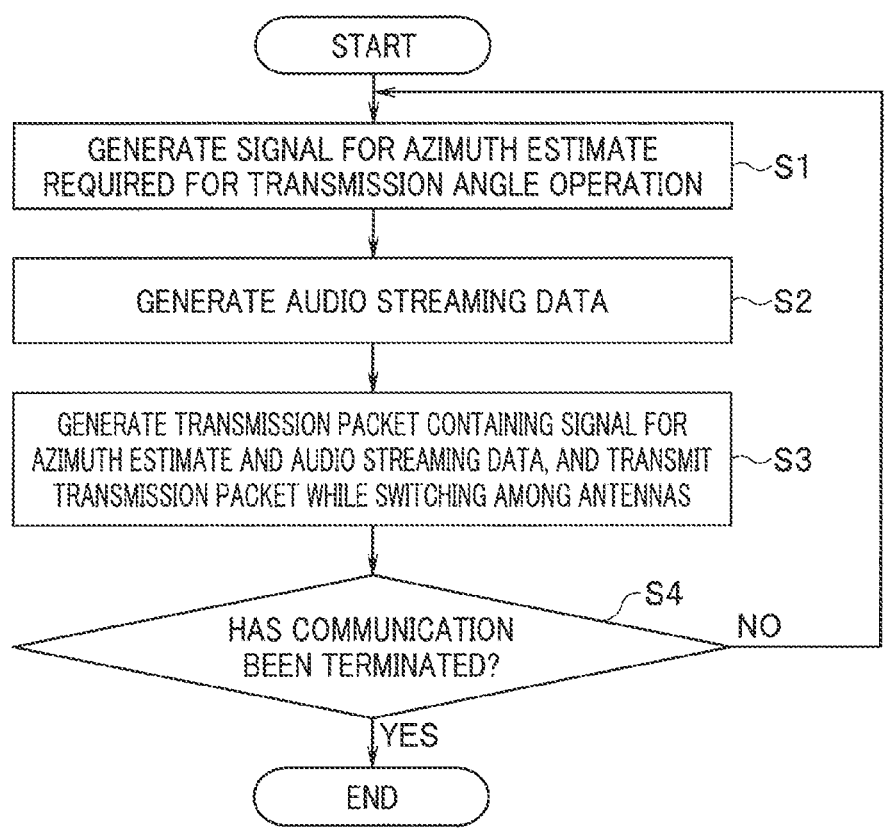
FIG. 8 is a flow chart showing an example of transmission processing of the transmission packet in the audio transmission device.

FIG. 8 is a flow chart showing an example of transmission processing of the transmission packet in the audio transmission device. Note that the transmission processing shown in FIG. 8 is carried out by the control unit 14 of the audio transmission device 10.

First, the control unit 14 generates the signal for azimuth estimate required for transmission angle operation (S1). Next, the control unit 14 generates the audio streaming data (S2). Thereafter, the control unit 14 generates the transmission packet P containing the signal for azimuth estimate and the audio streaming data, and transmits the transmission packet P while switching among the antennas 11a to 11d (S3).

The control unit 14 determines whether the communication has been terminated or not (S4). When it is determined that the communication has not been terminated (S4: NO), the control unit 14 returns the processing to S1 and repeats the same processing. On the other hand, when it is determined that the communication has been terminated (S4: YES), the control unit 14 terminates the processing.

FIG. 9 is a flow chart showing an example of volume control processing in the audio reception device. Note that the volume control processing shown in FIG. 9 is carried out by the control unit 23 of the audio reception device 20.

The control unit 23 receives via the antenna 21 the transmission packet P transmitted from the antennas 11a to 11d (S11). The control unit 23 carries out the operation processing of the transmission angle θ on the basis of the phase information of the transmission packet P transmitted from the antennas 11a to 11d (S12). The control unit 23 determines what the transmission angle θ is (S13).

When the transmission angle θ is determined to be at least 0 degrees and smaller than 60 degrees, the control unit 23 causes the left-side speaker 26a and the right-side speaker 26b to output the voice with the output of the left-side speaker 26a being set to 100% and the output of the right-side speaker 26b being set to 50% (S14).

When the transmission angle θ is determined to be at least 60 degrees and smaller than 120 degrees, the control unit 23 causes the left-side speaker 26a and the right-side speaker 26b to output the voice with the output of the left-side speaker 26a being set to 100% and the output of the right-side speaker 26b being set to 100% (S15).

When the transmission angle θ is determined to be at least 120 degrees and not more than 180 degrees, the control unit 23 causes the left-side speaker 26a and the right-side speaker 26b to output the voice with the output of the left-side speaker 26a being set to 50% and the output of the right-side speaker 26b being set to 100% (S16).

After carrying out the processing of S14, S15, or S16, the control unit 23 determines whether the communication has been terminated or not (S17). When it is determined that the communication has not been terminated, the control unit 23 returns the processing to S11 and repeats the same processing. On the other hand, when it is determined that the communication has been terminated, the control unit 23 terminates the processing.

Due to the aforementioned process, the audio reception device 20 can control the respective volume values of the left-side speaker 26a and the right-side speaker 26b according to the transmission angle θ of the transmission packet P.

In the related art, for example even in a case in which the lecturer moves right and left on a stage, the headphones worn on the user's ears played back audio with equal volume value for the left-side speaker and the right-side speaker. Therefore, the conventional audio reception device has not been able to carry out audio playback with presence in such a manner to make the listener perceive as if he/she is listening directly to a live voice, by outputting sound from the right side when the lecturer moves to the right side on the stage, and outputting sound from the left side when the lecturer moves to the left side on the stage.

On the other hand, the audio reception device 20 of the present embodiment sets the volume value of the right-side speaker 26b greater than the volume value of the left-side speaker 26a when the lecturer moves to the right side on the stage, and sets the volume value of the left-side speaker 26a greater than the volume value of the right-side speaker 26b when the lecturer moves to the left side on the stage, for example. Consequently, the audio reception device 20 is able to carry out audio playback in such a manner to make the user using the headphones 50 perceive as if he/she is listening directly to a live voice. Therefore, the audio reception device 20 configuring the acoustic apparatus according to the present embodiment enables audio playback with presence.

Various modifications shown in FIGS. 10 to 13 may be made to the above-described embodiment. In the above-described embodiment, the respective volume values of the left-side speaker 26a and the right-side speaker 26b are controlled in the cases of the transmission angle θ being: at least 0 degrees and smaller than 60 degrees; at least 60 degrees and smaller than 120 degrees; and at least 120 degrees and not more than 180 degrees. In other words, the above-described embodiment supposes that the transmission packet P is transmitted from a front side of the user using the headphones 50. However, it may also be envisaged that the transmission packet P is transmitted from a rear side of the user, that is at the transmission angle θ between 0 degrees and −180 degrees.

Given this, the control unit 23 may control the respective volume values of the left-side speaker 26a and the right-side speaker 26b in the cases of the transmission angle θ being: smaller than 0 degrees and at least −60 degrees; smaller than −60 degrees and at least −120 degrees; and smaller than −120 degree and at least −180 degrees.

FIG. 10 is a flow chart showing another example of the volume control processing in the audio reception device. Note that in FIG. 10 the processing similar to the processing shown in FIG. 9 is denoted by the same reference symbol and description of such processing is omitted.

The control unit 23 carries out the operation processing of the transmission angle θ in the processing of S12, and then determines what the transmission angle θ is (S21).

When the transmission angle θ is determined to be smaller than 0 degrees and at least −60 degrees, the control unit 23 advances the processing to S14 and causes the left-side speaker 26a and the right-side speaker 26b to output the voice with the output of the left-side speaker 26a being set to 100% and the output of the right-side speaker 26b being set to 50%.

When the transmission angle θ is determined to be smaller than −60 degrees and at least −120 degrees, the control unit 23 advances the processing to S15 and causes the left-side speaker 26a and the right-side speaker 26b to output the voice with the output of the left-side speaker 26a being set to 100% and the output of the right-side speaker 26b being set 100%.

When the transmission angle θ is determined to be smaller than −120 degrees and at least −180 degrees, the control unit 23 advances the processing to S16 and causes the left-side speaker 26a and the right-side speaker 26b to output the voice with the output of the left-side speaker 26a being set to 50% and the output of the right-side speaker 26b being set to 100%. Other processing is similar to the processing shown in FIG. 9.

In the above-described embodiment, for example when the lecturer frequently moves back and forth in the vicinity of the position at 60 degrees, the volume value for the left-side speaker 26a of the headphones 50 is frequently switched between 50% and 100%, making it difficult for the user using the headphones 50 to listen to the voice.

Given this, the control unit 23 controls the respective volume values of the left-side speaker 26a and the right-side speaker 26b when the transmission packet P is transmitted from the same angle range for at least a predetermined period of time. In other words, the control unit 23 measures a period of time during which the transmission angle θ falls within a certain angle range (0 to 60 degrees, 60 to 120 degrees, or 120 to 180 degrees) by means of, for example, an internal clock of the control unit 23. When the control unit 23 determines that the measured time period has exceeded the predetermined period of time, the control unit 23 changes the respective volume values of the left-side speaker 26a and the right-side speaker 26b. Such a configuration can prevent the volume value of at least one of the left-side speaker 26a or the right-side speaker 26b from being frequently switched.

FIG. 11 is a flow chart showing yet another example of the volume control processing in the audio reception device. Note that in FIG. 11 the processing similar to the processing shown in FIG. 9 is denoted by the same reference symbol and description of such processing is omitted.

The control unit 23 carries out the operation processing of the transmission angle θ in the processing of S12, and then determines what the transmission angle θ is and whether or not the transmission angle θ is in the same angle range for the predetermined period of time (S31).

When the transmission angle θ is determined to be at least 0 degrees and smaller than 60 degrees and in the same angle range for the predetermined period of time, the control unit 23 advances the processing to S14 and causes the left-side speaker 26a and the right-side speaker 26b to output the voice with the output of the left-side speaker 26a being set to 100% and the output of the right-side speaker 26b being set to 50%.

When the transmission angle θ is determined to be at least 60 degrees and smaller than 120 degrees and in the same angle range for the predetermined period of time, the control unit 23 advances the processing to S15 and causes the left-side speaker 26a and the right-side speaker 26b to output the voice with the output of the left-side speaker 26a being set to 100% and the output of the right-side speaker 26b being set 100%.

When the transmission angle θ is determined to be at least 120 degrees and not more than 180 degrees and in the same angle range for the predetermined period of time, the control unit 23 advances the processing to S16 and causes the left-side speaker 26a and the right-side speaker 26b to output the voice with the output of the left-side speaker 26a being set to 50% and the output of the right-side speaker 26b being set to 100%.

Although not illustrated, when the transmission angle θ is determined not to be in the same angle range for the predetermined period of time, the control unit 23 returns the processing to S11 and repeats the same processing.

In the above-described embodiment, the control unit 23 changes the respective volume values of the left-side speaker 26a and the right-side speaker 26b at every 60 degrees of the transmission angle θ. Alternatively, the control unit 23 may also change the respective volume values of the left-side speaker 26a and the right-side speaker 26b with finer granularity, for example at every 10 degrees or every 20 degrees of the transmission angle θ.

FIG. 12 is a diagram showing a relationship between a transmission angle of finer granularity and respective volume values of the left-side and right-side speakers; When the transmission angle θ is at least 0 degrees and smaller than 20 degrees, the control unit 23 sets the volume value for the left-side speaker 26a to 100%, and the volume value for the right-side speaker 26b to 60% on the basis of the relationship shown in FIG. 12.

When the transmission angle θ is at least 20 degrees and smaller than 40 degrees, the control unit 23 sets the volume value for the left-side speaker 26a to 100%, and the volume value for the right-side speaker 26b to 70% on the basis of the relationship shown in FIG. 12.

When the transmission angle θ is at least 40 degrees and smaller than 60 degrees, the control unit 23 sets the volume value for the left-side speaker 26a to 100%, and the volume value for the right-side speaker 26b to 80% on the basis of the relationship shown in FIG. 12.

When the transmission angle θ is at least 60 degrees and smaller than 80 degrees, the control unit 23 sets the volume value for the left-side speaker 26a to 100%, and the volume value for right-side speaker 26b to 90% on the basis of the relationship shown in FIG. 12.

When the transmission angle θ is at least 80 degrees and smaller than 100 degrees, the control unit 23 sets the volume value for the left-side speaker 26a to 100%, and the volume value for the right-side speaker 26b to 100% on the basis of the relationship shown in FIG. 12.

When the transmission angle θ is at least 100 degrees and smaller than 120 degrees, the control unit 23 sets the volume value for the left-side speaker 26a to 90%, and the volume value for the right-side speaker 26b to 100% on the basis of the relationship shown in FIG. 12.

When the transmission angle θ is at least 120 degrees and smaller than 140 degrees, the control unit 23 sets the volume value for the left-side speaker 26a to 80%, and the volume value for the right-side speaker 26b to 100% on the basis of the relationship shown in FIG. 12.

When the transmission angle θ is at least 140 degrees and smaller than 160 degrees, the control unit 23 sets the volume value for the left-side speaker 26a to 70%, and the volume value for the right-side speaker 26b to 100% on the basis of the relationship shown in FIG. 12.

When the transmission angle θ is at least 160 degrees and smaller than 180 degrees, the control unit 23 sets the volume value for the left-side speaker 26a to 60%, and the volume value for the right-side speaker 26b to 100% on the basis of the relationship shown in FIG. 12.

Furthermore, the control unit 23 may also change the granularity according to a size of a venue. The size of the venue is determined by, for example, the control unit 23 figuring out an approximate distance value on the basis of signal intensity and then comparing magnitude with a reference distance. For example, the control unit 23 employs finer granularity for a venue greater in size and employs coarser granularity for a venue smaller in size. By employing finer granularity in the case of the larger venue, a problem of the respective volume values of the left-side and right-side speakers being not readily changeable due to a small change in the transmission angle when the lecturer moves on a distant stage, can be solved. Alternatively, for example, coarser granularity may be employed for a venue greater in size and finer granularity may be employed for a venue smaller in size. In a smaller venue, since a distance between a listener and a stage is small, the transmission angle is likely to be largely changed when the lecturer moves in the horizontal direction in FIG. 6. By employing finer granularity in the case of the smaller venue, the change in the position of the lecturer (transmission angle) can be reflected more precisely to the respective volume values of the left-side and right-side speakers.

When the audio transmission device is in the vicinity of the center of the stage, that is when the transmission angle is around 90 degrees, the change in the transmission angle is great with respect to the moving distance of the lecturer. The granularity of the transmission angle may be set finer when the transmission angle is closer to 90 degrees, and coarser when the transmission angle is closer to 0 degrees or 180 degrees.

The control unit 23 may also change the respective volume values of the left-side speaker 26a and the right-side speaker 26b according to loudness of the lecturer's voice, that is loudness of the voice based on the audio streaming data. In this case, for example with a first threshold value being defined, the control unit 23 changes the volume values based on the table shown in FIG. 7 when the loudness of the lecturer's voice is smaller than the first threshold value, and changes the volume values based on the table shown in FIG. 13, in which volume values are smaller than the volume values in the table shown in FIG. 7, when the loudness of the lecturer's voice is greater than or equal to the first threshold value. FIG. 13 is a diagram showing a relationship between a transmission angle and respective volume values of left-side and right-side speakers when loudness of a lecturer's voice is greater than or equal to a first threshold.

In a case in which the audio transmission device 10 includes three or more antennas, the antennas may be configured to be arranged: in two directions at regular intervals; or two-dimensionally in a circular manner at regular intervals. In this case, the sound image can be adjusted on the basis of a biaxial signal angle (azimuth angle and elevation angle), whereby audio playback with more presence can be carried out even in a case in which the lecturer (transmission side) talks on a high stage for example.

The respective volume values of the left-side speaker 26a and the right-side speaker 26b have been exemplified as a component of the sound image adjusted by the audio reception device 20. However, the component of the sound image is not limited to the volume value. The sound image can also be adjusted through: increasing sound pressure or advancing output timing of the voice output from the speaker closer to the audio transmission device 10 compared to the voice output from the other speaker; adjusting the phase; adjusting the sound spectrum; and the like, on the basis of the transmission angle θ.

Second Embodiment

Next, the second embodiment is described.

Figure 14:
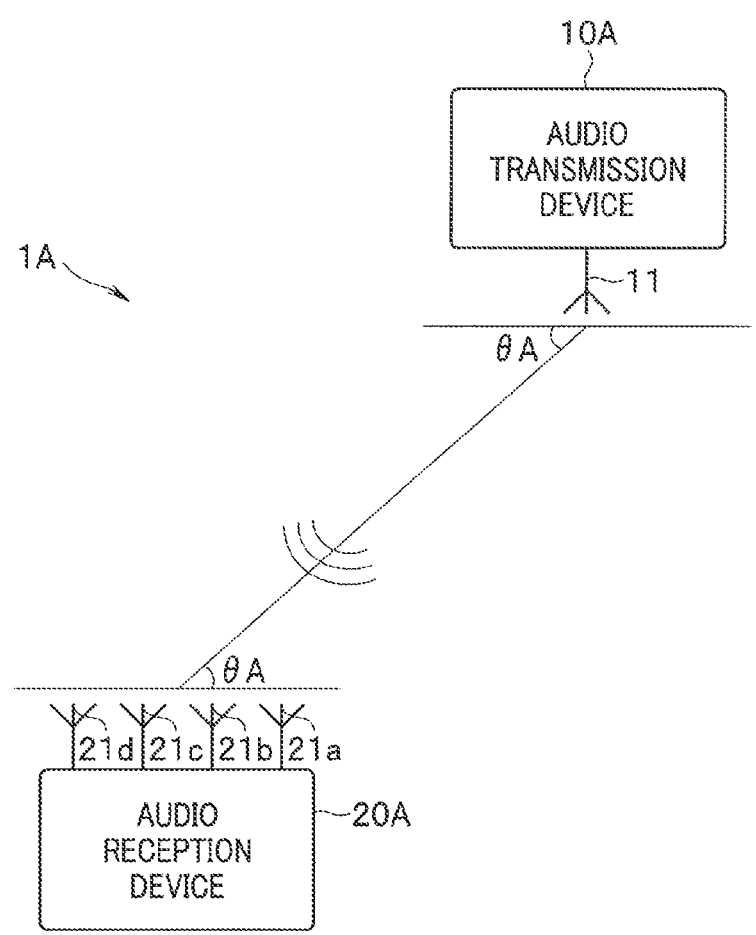
FIG. 14 is a diagram showing a configuration of a communication system of a second embodiment.

FIG. 14 is a diagram showing a configuration of a communication system of the second embodiment.

As shown in FIG. 14, a communication system 1A is provided with an audio transmission device 10A and an audio reception device 20A. The audio transmission device 10A is provided with one antenna 11. The audio reception device 20A is provided with a plurality of antennas 21a, 21b, 21c, and 21d. Note that although the audio reception device 20A is provided with the four antennas 21a to 21d in the example shown in FIG. 10, the present embodiment is not limited to such a configuration and only required to be provided with at least two antennas.

The audio transmission device 10A transmits a transmission packet P containing audio streaming data to the audio reception device 20A.

The audio reception device 20A receives, with sequential switching among the antennas 21a to 21d, the transmission packet P transmitted from the audio transmission device 10A, and plays back voice based on the audio streaming data. The audio reception device 20A calculates a reception angle θA of the transmission packet P on the basis of a difference of route upon reception, and controls information related to a sound image according to the reception angle θA.

As described above, the audio reception device 20A of the second embodiment is of the AoA (angle of arrival) method, by which the transmission packet P transmitted from the one antenna 11 of the audio transmission device 10A is received with switching among the plurality of antennas 21a to 21d, and azimuth estimate is carried out.

The internal configurations of the audio transmission device 10A and the audio reception device 20A are different from the internal configurations of the audio transmission device 10 and the audio reception device 20 of the first embodiment in that the control unit 23A of the audio reception device 20A receives the transmission packet P with switching among the plurality of antennas and calculates the reception angle θA. Note that as shown in FIG. 6, when the lecturer and the listener are oriented in the vertical direction in FIG. 6, the transmission angle and the reception angle are of the same value. In the second embodiment, the respective volume values of the left-side speaker 26a and the right-side speaker 26b can be controlled by determining the signal angle with the reception angle θA instead of the transmission angle θ of the first embodiment.

Note that the respective steps in the flow charts in the present specification may be performed in a modified execution order, in a simultaneous manner, or in different execution orders in every execution, unless the characteristics of the steps are impaired.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An acoustic apparatus comprising:
   a reception unit configured to receive a packet to which voice data and a signal for azimuth estimate are added;
   an operation unit configured to operate a signal angle of the packet by using the signal for azimuth estimate; and
   a control unit configured to control information related to a sound image of the voice data according to the signal angle.

2. The acoustic apparatus according to claim 1,
   further comprising a first speaker and a second speaker configured to output voice based on the voice data,
   wherein the control unit controls respective volume values of the first speaker and the second speaker according to the signal angle.

3. The acoustic apparatus according to claim 2,
   wherein the control unit controls the respective volume values of the first speaker and the second speaker when the packet is received from the signal angle within a predetermined range for at least a predetermined period of time.

4. The acoustic apparatus according to claim 2,
   wherein the control unit controls the respective volume values of the first speaker and the second speaker according to loudness of the voice based on the voice data.

5. The acoustic apparatus according to claim 2,
   wherein the control unit controls voice output timing, a phase, and/or a voice spectrum of each of the first speaker and the second speaker according to the signal angle.

6. The acoustic apparatus according to claim 1,
   wherein the operation unit operates the signal angle based on phase information of the packet.

7. The acoustic apparatus according to claim 1, further comprising one antenna,
   wherein the packet transmitted with switching among a plurality of antennas is received by the one antenna.

8. The acoustic apparatus according to claim 1, further comprising a plurality of antennas,
   wherein the packet transmitted from one antenna is received while switching among the plurality of antennas.

9. The acoustic apparatus according to claim 1, further comprising a first plurality of antennas,
   wherein the packet transmitted from a second plurality of antennas is received while switching among the first plurality of antennas.

10. A volume control method for an acoustic apparatus comprising:
    receiving a packet to which voice data and a signal for azimuth estimate are added;
    operating a signal angle of the packet by using the signal for azimuth estimate; and
    controlling information related to a sound image of the voice data according to the signal angle.

11. The volume control method for an acoustic apparatus according to claim 10,
    wherein the acoustic apparatus further comprises a first speaker and a second speaker configured to output voice based on the voice data; and
    respective volume values of the first speaker and the second speaker are controlled according to the signal angle.

12. The volume control method for an acoustic apparatus according to claim 11,
    wherein the respective volume values of the first speaker and the second speaker are controlled when the packet is received from the signal angle within a predetermined range for at least a predetermined period of time.

13. The volume control method for an acoustic apparatus according to claim 11,
    wherein the respective volume values of the first speaker and the second speaker are controlled according to loudness of the voice based on the voice data.

14. The volume control method for an acoustic apparatus according to claim 11,
    wherein voice output timing, a phase, and/or a voice spectrum of each of the first speaker and the second speaker are controlled according to the signal angle.

* * * * *